UNITED STATES PATENT OFFICE.

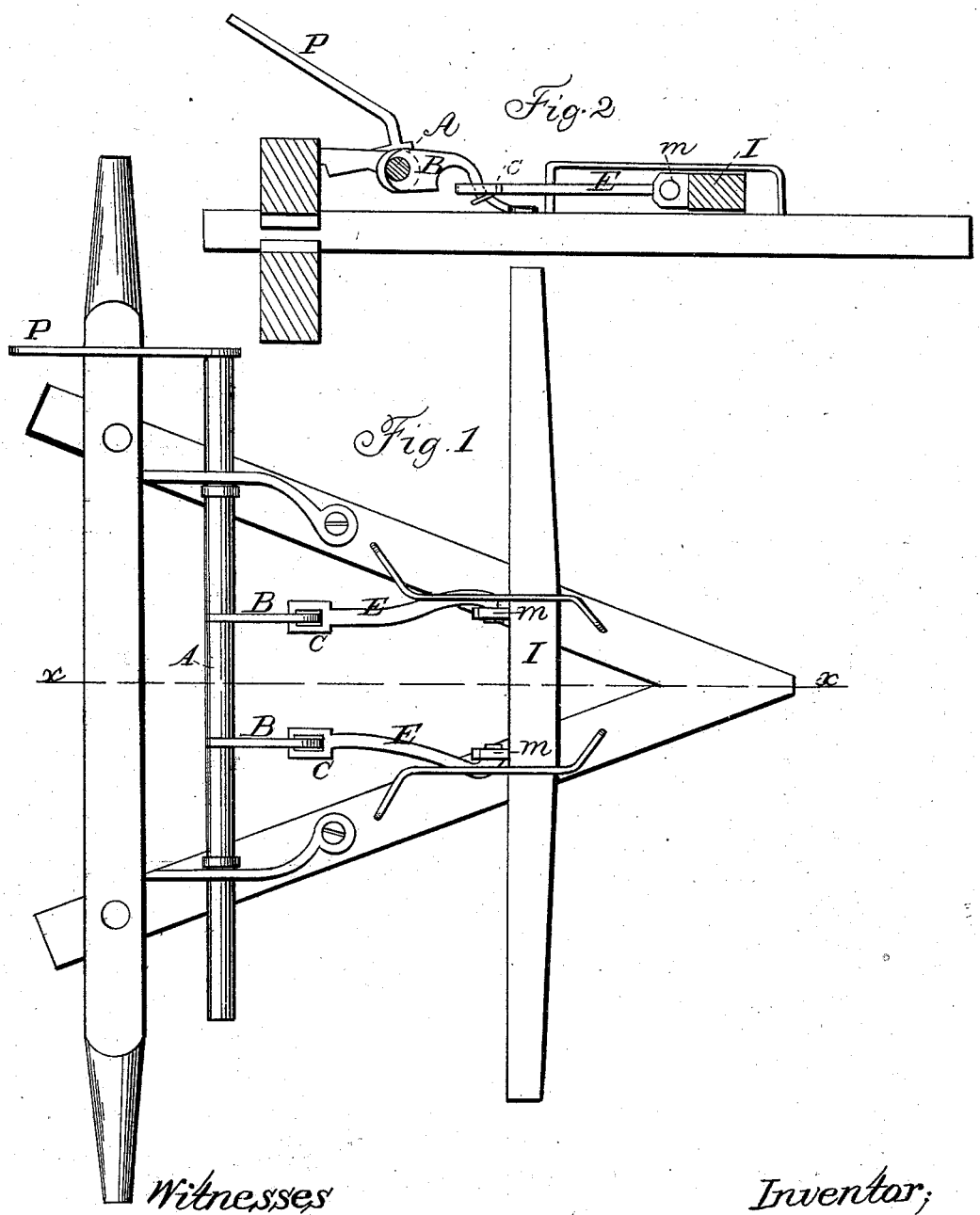

JOHN SNYDER, OF CENTRE COUNTY, PENNSYLVANIA.

IMPROVEMENT IN WAGON-BRAKES.

Specification forming part of Letters Patent No. 43,436, dated July 5, 1864.

*To all whom it may concern:*

Be it known that I, JOHN SNYDER, of Centre county, and State of Pennsylvania, have invented a new and Improved Wagon Brake; and I hereby declare that the following is a full, clear, and exact description thereof, reference being had to the accompanying drawings, forming part of this specification, and to the letters of reference marked thereon, in which—

Figure 1 represents a top or plan view of my invention, and Fig. 2 a vertical section through line $x$ $x$, Fig. 1.

The nature of my invention consists in welding or otherwise securing to the horizontal shaft A two crank-levers, B B, the form of which is clearly seen in sectional drawing. These levers operate freely in the oblong mortises $c$ $c$ of the connecting-rods E E. The rods E E are secured to the rubber I by means of the projecting eyes $m$ $m$.

It will be readily seen that from the curved form of the levers B B a movement to the right of the shaft-lever P will draw the rubber I forward with sufficient force to securely lock the wheels, or by reverse motion will force the rubber farther from the wheels than is secured by methods now in practice.

What I claim as new, and for which I desire to procure Letters Patent, is—

The shaft A, crank-levers B B, operating in the mortises $c$ $c$, with the rubber I and lever P, all constructed and arranged as described.

JOHN SNYDER.

Witnesses:
JOHN H. STOVER,
ISRAEL M. STOVER.